April 16, 1968  M. J. McINTYRE ETAL  3,378,232
REGENERATIVE INTERLOCKING YARDER SYSTEM
Filed April 18, 1966
FIG__1
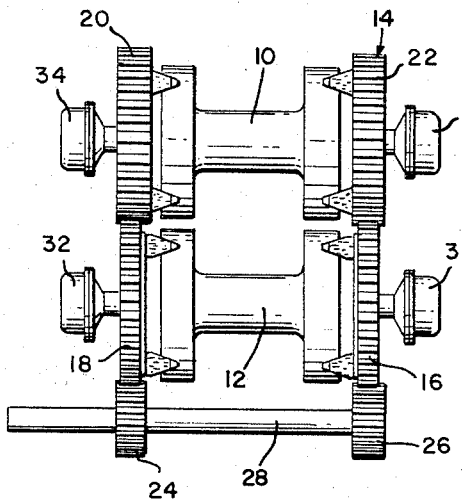
FIG__2
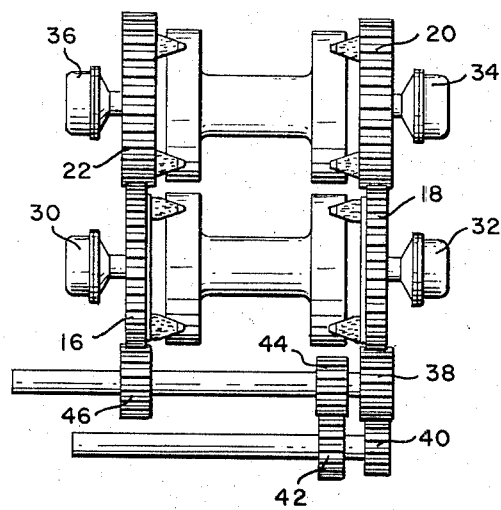
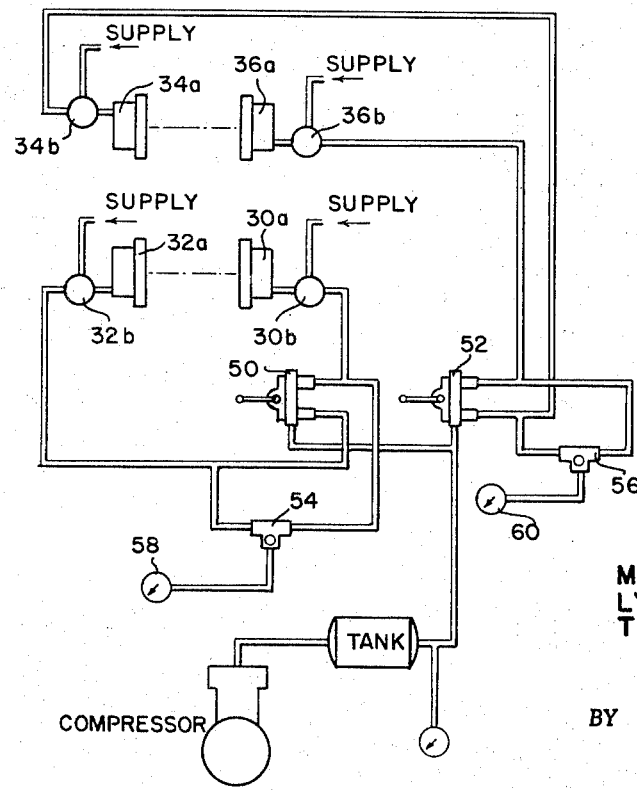
FIG__3
MAURICE J. MC INTYRE
LYLE O. CHELDELIN
THOMAS J. REYNOLDS
*INVENTORS*
BY 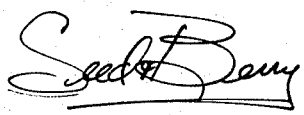
*ATTORNEYS*

United States Patent Office 3,378,232
Patented Apr. 16, 1968

3,378,232
REGENERATIVE INTERLOCKING
YARDER SYSTEM
Maurice J. McIntyre, Sedro Woolley, Lyle O. Cheldelin, Bellingham, and Thomas J. Reynolds, Sedro Woolley, Wash., assignors to The Humboldt Company, Seattle, Wash., a corporation of Washington
Filed Apr. 18, 1966, Ser. No. 543,289
7 Claims. (Cl. 254—185)

ABSTRACT OF THE DISCLOSURE

The ability to continuously regenerate at two gear ratios, both on the inhaul and on the outhaul, is provided by a regenerative interlocking logging yarder that has four slippable frictions in all, one being disposed at each end of the inhaul and outhaul drums. The gear train drives to both sides of the cable drums so that the gears on either side of either drum can be positively engaged for driving the drum or non-positively engaged to regenerate power back into the drive train.

This invention relates to timber yarding systems and more particularly to regenerative, interlocking yarders employed in timber yarding systems.

In general, a timber yarding system comprises at least an inhaul, or mainline, cable employed for pulling a turn of logs to a loading point, an outhaul, or haulback, cable employed for pulling the inhaul cable back for another turn of logs, a butt rigging assembly interconnecting the outer ends of the cables for attachment to a turn of logs, and a yarder assembly having inhaul and outhaul cable winding drums to which the inner ends of the respective cables are attached such that driving one drum to wind cable thereon effects the drawing of cable from the other drum. The inhaul and outhaul drums are commonly interconnected by an engine driven drive train having interlocking gears which are engageable to the drums by friction braking devices such as friction clutches such that a selected one of the drums is driven by the gear train to wind cable thereon and such that the other drum, driven by cable being drawn therefrom, drives its respective gear in the drive train thereby regenerating power back to the drive train to supplement the driving power of the engine. In order for this type of power regeneration to occur, as a practical matter, the cable-driven drum must be permitted to rotate more rapidly than the interlocking gear train would otherwise permit by slipping the clutch that links the cable-driven drum to the gear train, commonly called "slipping friction." Consequently, heat of friction will be generated as regeneration takes place.

Under certain conditions, severe heat problems due to prolonged slipping of frictions can be created. For example, in tightline logging operations, both the inhaul and outhaul cables must be taut and thus slipping of frictions must take place continuously. Some regenerative interlocking devices are provided for tightline logging with special gear trains and friction clutches for the inhaul and outhaul drums, to minimize slipping of frictions. The correct interlocking gear ratio between the inhaul and outhaul drums continuously changes as one cable winds up on its drum and the other cable unwinds from its drum and consequently a high degree of skill on the part of an operator is needed to operate the gear train to minimize clutch slippage. Because of the severe heat problems associated with tightline logging and the degree of operator skill required, however, such specialized regenerative interlocking devices are not in fact operated so as to maintain tightline conditions. Instead, the inhaul and outhaul cables are permitted to alternately slacken by employing an interlock gear ratio that pays out more cable than is drawn in, commonly called "making line," and then tighten by employing an interlock gear ratio that draws in more cable than is payed out thereby necessitating slippage friction on the drum that is paying out cable, commonly called "slipping line." As a practical matter, shifting from one gear ratio to another can not be effected so as to prevent either making line or slipping line and, consequently, tightline conditions can be only approximated.

A primary object of this invention is to provide a regenerative drum interlocking device that can be operated to provide tightline conditions by continuously slipping frictions without creation of severe heat problems. Another object is to provide such a device that can be operated to provide tightline conditions in both cable winding directions. A further object is to provide such a device wherein the gears of the drive trains on opposite sides of a drum assembly, are selectively engageable with their respective cable drum ends in either a positive manner or a nonpositive slipping manner.

These and other objects and advantages will become apparent from the following description in conjunction with the accompanying drawing, in which:

FIG. 1 is a plan view of a regenerative interlocking yarder illustrating one gear arrangement and means for engaging the cable drums thereto in accordance with this invention;

FIG. 2 is a plan view of a regenerative interlocking yarder illustrating another gear arrangement in accordance with the invention; and FIG. 3 is an exemplary pictorial diagram of a pneumatic control circuit for actuating means for engaging the cable drums to a gear assembly in accordance with this invention.

The regenerative drum interlocking device of this invention comprises a drum assembly including at least two cable winding drums, two gear trains disposed on opposite sides of the drum assembly, and an engine driven power train drivingly interlocked with the two gear trains. Each of the gear trains comprises interlocked gear members, the drum ends each having an associated gear adapted to rotatably engage therewith. Means are associated with each of the drum ends for selectively engaging associated gear members therewith, and are adapted (a) to effect a positive interlock between a selected end of one of the drums and an associated gear member to drive the thus-positively-engaged drum from the power train to wind cable thereon and (b) to effect a nonpositive slipping interlock between a selected end of the other drum and an associated gear member to regeneratively drive the positively engaged drum when such other drum is driven by cable unwinding therefrom. The aforementioned means preferably comprise friction clutches but may comprise friction brakes. The drum selected for having cable wound thereon may be either of two drums and therefore the engaging means must be capable of effecting a positive interlock with both drums and capable of effecting a non-positive slipping interlock between each end of both drums and the associated gear members. The gear members may be interlocked by direct meshing or may be interlocked through one or more intermediate gear members, the latter occurring for example if a third drum were positioned between the mainline and haulback line drums.

With this arrangement of frictions at each end of the inhaul and outhaul drums, two frictions can be alternately slipped on the inhaul drum as cable is being found on the outhaul drum, and then the remaining tow frictions can be alternately slipped on the outhaul drum as cable is being wound on the inhaul drum. Thus the duration of slippage of each friction can be reduced since there are two frictions that can be slipped in each direction thereby eliminating heat problems caused by prolonged slipping of one friction. Furthermore, because of the arrangement of the two gear trains, slipping of friction in this manner can be accomplished concurrently with continuous power regeneration in both cable winding directions. In addition to these features, by proper selection of the interlocking gear ratios continuous slipping of frictions, divided between the four frictions, can occur in both cable winding directions without making line by a single gear ratio shift as cable is being found in either of the two directions.

FIG. 1 depicts one arrangement of this invention wherein the haul and outhaul gears are interlocked by direct meshing. The inhaul and outhaul drums are designated in their entireties by the numerals 10 and 12, respectively, and the gear train by the numeral 14. The gear trains comprise gear wheels 16 and 22 and 18 and 20, respectively, one gear wheel being disposed axially of each drum end as shown in a conventional manner, and an engine driven power train which meshes with each gear train by drive pinions 24 and 26, mounted on a reversible input drive shaft 28 leading to an engine transmission. Cone-type friction clutches 30, 32, 34 and 36 are disposed axially of each end of the drums to engage their respective associated gear wheels with the adjacent drum end, either in a positive driving manner or in a non-positive slipping manner as desired. These friction clutches are well-known and are disposed within the respective gear wheels in the usual manner and are therefore only shown schematically.

By appropriate design of the interlocking gear ratios, the four frictions can be slipped in the above-described manner without making line in either direction. The interlock ratio from gear wheels 16 to gear wheels 20 through drive pinions 26 and 24 and gear wheel 18 would be the correct ratio of nonslipping conditions when the inhaul drum is full; the interlock ratio from gear wheel 16 to gear wheel 22 would be the correct ratio for non-slipping conditions when the inhaul drum is filled at a predetermined level; and the interlock ratio from gear wheel 22 to gear wheel 18 through gear wheel 16 and drive pinions 26 and 24 would be the correct ratio for non-slipping conditions when the inhaul drum is substantially empty.

Thus, the FIG. 1 arrangement can be operated as follows: clutch 30 positively engages gear wheel 16 with the outhaul drum to drive the outhaul drum through drive pinion 26 and gear wheel 16 to begin winding in the outhaul cable and drawing out the inhaul cable, and clutch 34 nonpositively engages gear wheel 20 with the inhaul drum to slip friction as the inhaul cable unwinds thereby adding regenerative power to the outhaul drum through gear wheels 20 and 18, drive pinions 24 and 26, and gear wheel 16. When the inhaul cable has been drawn out a predetermined distance, clutch 34 disengages and clutch 36 non-positively engages gear wheel 22 with the inhaul drum to slip friction as the inhaul cable continues to unwind until it is pulled out as far as desired thereby adding regenerative power through gear wheels 22 and 16. When the inhaul cable is to be pulled in, clutch 36 positively engages gear wheel 22 with the inhaul drum to drive the inhaul drum through drive pinion 26 and gear wheels 16 and 22, clutch 32 non-positively engages gear wheel 18 with the outhaul drum to slip friction as the outhaul cable unwinds thereby adding regenerative power to the inhaul drum through gear wheels 18, drive pinions 24 and 26, and gear wheels 16 and 22. When the inhaul cable has been drawn to the aforementioned predetermined distance, clutch 32 disengages and clutch 30 non-positively engages to slip friction as the outhaul cable continues to unwind until the inhaul cable has been drawn in completely thereby adding regenerative power to the inhaul drum through gear wheels 16 and 22. As will be noted, the above-described manner of shifting frictions maintains the same power drive through drive pinion 26 so that there is no abrupt change in cable speed as would occur if the drive was shifted between drive pinions 24 and 26. Also, each friction is slipped only once in a complete cycle of (1) drawing the inhaul cable out and then (2) pulling the inhaul cable back in.

The following is a numerical example of the foregoing arrangement wherein continuous regeneration and slipping of frictions without making line can be effected.
Inhaul cable-1⅜ inch mainline 1400 feet in length;
Outhaul cable-1 inch haulback line 2800 feet in length;
Inhaul (mainline) and outhaul (haulback) drums of equal sizes;
Ratios of pitch diameters of the drums, (1) about 2.06:1 with the mainline in, (2) about 1.196:1 with the mainline half out, and (3) about 0.627 with the mainline entirely out.

Since outgoing line slip is required at all times ("making line" would lower the load), ratio #1 above will be used to midpoint and then shift to ratio #2 for the remainder of the outgoing main line (main line slipping). For incoming main line, ratio #3 is used first and then ratio #2 (haulback slipping).

Referring to the arrangement of FIG. 1, four ratios are possible by applying two frictions at a time. They are 22–16, 18–20, 22–18 and 16–20. In order to obtain the desired numerical values by driving forward and backward through the same gears one ratio must be the same multiple of one of the required ratios as relates to the other two. This can be accomplished several ways but the following is chosen because it does not widen the total ratio spread.

$$\frac{(2.06)(.627)}{1.196} = 1.080$$

This fourth ratio gives a sequence of ratios with 1.91 multiplier as shown below:

$$\left.\begin{array}{l}2.06\\1.08\end{array}\right\} \text{------------------------------------} 1.91$$

$$\left.\begin{array}{l}1.96\\0.627\end{array}\right\} \text{------------------------------------} 1.91$$

One ratio (1.08) will not be used and the others are applied so that the same friction will not be slipped twice during a cycle and so that the power drive will not be changed at the mid-point shift.

The minimum size gear to clear the cone-type friction clutches is a 76 tooth gear wheel. This is gear wheel 16. Gear wheel 22 is:

$$(76)(1.196) = 90.9 \text{ use 91 teeth}$$

Drum centers then accommodate 76+91=167 teeth; therefore gear wheel 20 is:

$$167-80 = 98 \text{ teeth}$$

Calling the drive pinions 24–26, X and Y respectively:

$$\frac{91}{9} \times \frac{X}{80} = 0.627; \quad 91x = 50.29; \quad X = .558Y$$

and:

$$76+9 = 80+X$$

Solving for X and Y:

76+9=80+.558Y     X=.558Y
.442Y=4     =(.558)(9.05)
Y=9.05     =5.05

Since 5 tooth gears and 9 tooth gears are too small to be practical gears, a double reduction is incorporated in place of the pinions and is found by trial and error to give the required ratios. The final arrangement is then as appears in FIG. 12. The 5 tooth pinion X is replaced by pinions 38, 40, 42 and 44 having 26 teeth, 30 teeth, 36 teeth and 20 teeth, respectively. The 9 tooth pinion Y is replaced by pinion 46 having 30 teeth. Pinions 46 and 44 are pinned to shaft 48 and pinion 38 is freely rotatable on shaft 48. Pinions 40 and 42 are pinned to parallel shaft 50 and are meshed with pinions 38 and 44, respectively.

When operating the invention under tightline conditions the gear ratio shift cannot be made prematurely for either direction without effecting more slip than is necessary and cannot be made belatedly without making line. Thus, if less than half of the inhaul cable is to be drawn out in the above example, no midpoint gear ratio shift would be made in either direction, and, if more than half of the inhaul cable is to be drawn out in the above example, a midpoint gear ratio shift would be made in both direction when 700 feet of inhaul line is out even if the full 1400 feet is not employed.

The invention also can be operated in the manner of a conventional two way-two speed interlock yarder if desired. Thus, the invention can be operated in a more-or-less conventional manner, alternated by slackening and tightening the inhaul and outhaul cables if tightline conditions need not be maintained. No slipping of frictions and no power regeneration can be effected if such is desired.

FIG. 3 illustrates a pilot pressure operated air system for actuating the friction clutches. Four clutch actuating cylinders 30a, 32a, 34a and 36a, positioned adjacent the respective friction clutches 30, 32, 34 and 36, are each communicable with air supply pressure through quick release valves 30b, 32b, 34b and 36b. The release valves on opposite sides of each drum, 30b–32b and 34b–36b, are pilot operated by manual pilot pressure valves 50 and 52, respectively. By shifting one of the valve handles in one direction from closed position, pilot pressure will actuate one of the respective valves 30b–32b or 34b–36b. By shifting one of the valve handles in the opposite direction from closed position, pilot pressure will actuate the other of the respective valves. The quick release valves are designed for rapid venting to atmosphere when pilot actuating pressure to the quick release valves is terminated. Two way check valves 54 and 56, ported to pressure gages 58 and 60 respectively, are connected to the air lines connecting each pilot valve to their respective quick release valves to permit an operator to observe the air pressure on the clutch actuating cylinders. The pilot control valves permit adjusting the degree of clutch engagement from zero to full non-slipping engagement by shifting the control handles from zero up to full pilot pressure. The FIG. 3 arrangement simplifies control of the system of this invention since the four quick release valves are operated by two handles.

It is thought that the invention will have been clearly understood from the foregoing detailed descriptions. Change in the details of construction will suggest themselves and may be resorted to without departing from the spirit of the invention, wherefore it is our intention that no limitations be implied and that the hereto annexed claims be given a scope fully commensurate with the broadest interpretation to which the employed language admits.

What is claimed is:

1. In a cable system for transporting materials having a drum assembly with at least two cable winding drums wherein cables are applied to the drums and operatively connected at their outer ends in a manner whereby the winding of cable onto one drum effects the drawing of cable from the other drum and vice versa, the improvement comprising gear train means for transferring power from a power source to either of said drums and for transferring regenerative power from the other of said drums at either of two gear ratios; and means adapted (a) to positively engage either of said drums with said gear train means to wind cable thereon and (b) to non-positively engage the other of said drums with said gear train means for power regeneration at either of two gear ratios when cable is unwinding therefrom.

2. In a cable system for transporting materials having a drum assembly with at least two cable winding drums wherein cables are applied to the drums and operatively connected at their outer ends in a manner whereby the winding of cable onto one drum effects the drawing of cable from the other drum and vice versa, the improvements comprising first and second gear trains disposed on opposite sides of said drum assembly, each of said gear trains comprising interlocked gear members with each of the drum ends having an associated gear member adapted to rotatably engage therewith; an engine driven power train drivingly interlocked with said first and second gear trains; means associated with each of said drum ends for selectively engaging associated gear members therewith, said means being adapted to effect a positive interlock between a selected one of either of said drums and an associated gear member to drive such positively engaged drum from said power train to wind cable thereon and to effect a non-positive slipping interlock between either end of the other of said drums and an associated gear member to regeneratively drive said positively engaged drum when the non-positively engaged drum is driven by cable unwinding therefrom.

3. The apparatus according to claim 2 wherein the engaging means comprises four friction clutches, each friction clutch being operatively associated with one of the ends of said drums.

4. A regenerative interlock yarder comprising a drum assembly having an inhaul drum and an outhaul drum; first and second gear trains disposed on opposite sides of said drum assembly, each of said gear trains comprising interlocked gear wheels with each drum end having an associated gear wheel adapted to rotatably engage with the associated drum end; and four friction clutches, each operatively associated with a drum end to positively and nonpositiveley engage the associated gear wheel with the drum end such that a positive interlock with a selected one of either of said drums and a non-positive power regenerating interlock with either end of the other drum can be effected.

5. A regenerative interlock yarder according to claim 4 including an engine drive power train drivingly interlocked with said gear trains which comprises a drive shaft, a pinion gear in driving mesh with one of said gear trains and driven by said drive shaft, and a gear assembly in driving mesh with the other of said gear trains and driven by said drive shaft.

6. A regenerative interlock yarder according to claim 4 including a pneumatic control system for actuating said friction clutches.

7. A method of operating a cable winding system having a drum assembly with at least inhaul and outhaul cable winding drums and inhaul and outhaul cables applied to the respective drums and operatively connected at their outer ends such that winding of cable on one drum effects the drawing of cable from the other drum and vice versa, first and second gear trains disposed on opposite sides of the drum assembly with an interlocked gear member associated with each drum end, a power train drivingly interlocked with the gear trains, and means associated with each drum end for selectively engaging associated gear members therewith, the steps of: positively engaging a first gear member with the associated end of said outhaul drum and non-positively engaging a second gear member with the associated end of said inhaul drum and driving said gear trains to effect the simultaneous winding of cable on said outhaul drum and power regeneration until a predetermined length of inhaul cable is drawn from said inhaul drum; disengaging said second gear member and non-positively engaging a third gear member with the associated other end of said inhaul drum upon reaching said predetermined inhaul cable length to simultaneously effect the further winding of cable on said outhaul drum and further power regeneration; attaching a turn of logs to the operatively connected cable ends when said inhaul cable is drawn out to a desired distance; disengaging said first gear member and positively engaging said second gear member and non-positively engaging a fourth gear member with the associated other end of said outhaul drum and driving said gear trains to effect the simultaneous winding of cable on said inhaul drum and power regeneration; and disengaging said fourth gear member and non-positively engaging said first gear member upon reaching said predetermined inhaul cable length to simultaneously effect the further winding of cable on said inhaul drum and further power regeneration.

References Cited

UNITED STATES PATENTS

| 3,158,355 | 11/1964 | Wilson | 254—185 |
| 3,268,210 | 8/1966 | Wilson | 254—185 |

ANDRES H. NIELSEN, *Primary Examiner.*

EVON C. BLUNK, *Examiner.*

H. C. HORNSBY, *Assistant Examiner.*